Jan. 30, 1962 T. A. INSOLIO ETAL 3,018,587
GLASS CUTTER TROLLEY UNIT
Filed May 31, 1957 4 Sheets-Sheet 1

INVENTORS.
Thomas A. Insolio
Peter J. Magrini, Sr.
Reno Carini
Zayman C. Clements
BY
Webb, Mackey & Burden
THEIR ATTORNEYS Jan. 30, 1962
T. A. INSOLIO ETAL
3,018,587
GLASS CUTTER TROLLEY UNIT
Filed May 31, 1957
4 Sheets-Sheet 2
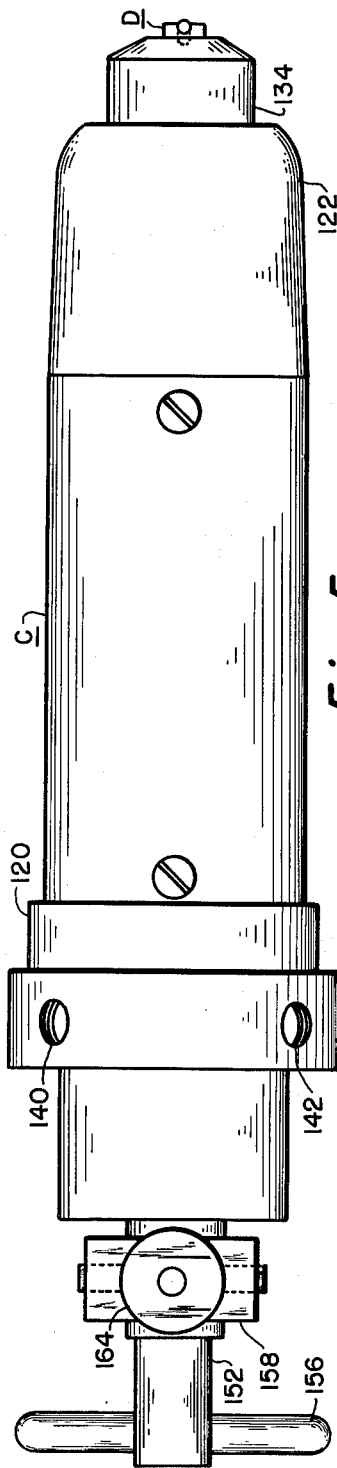
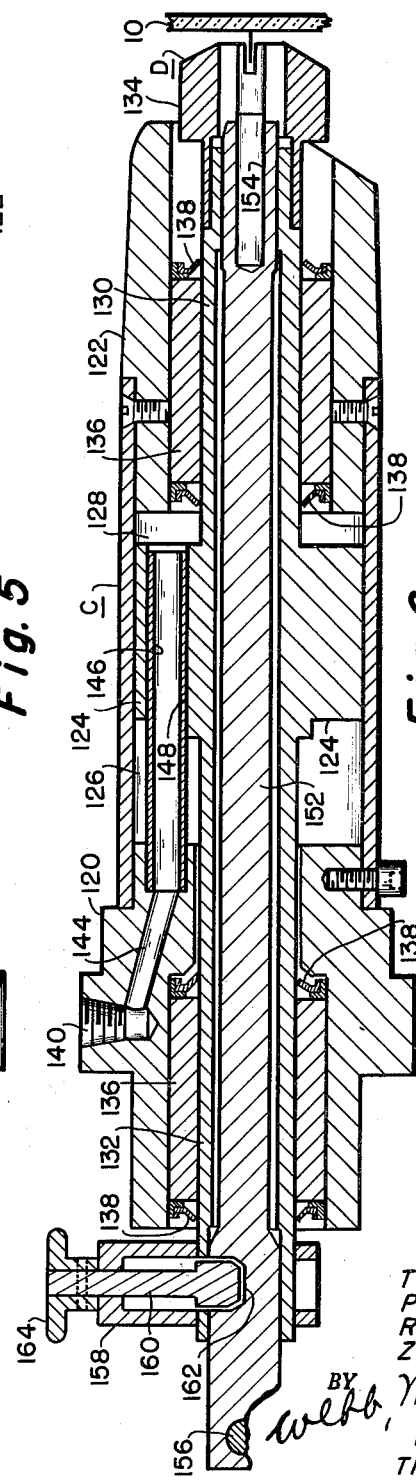
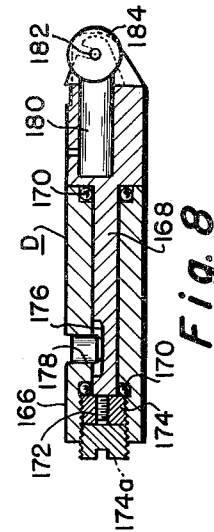
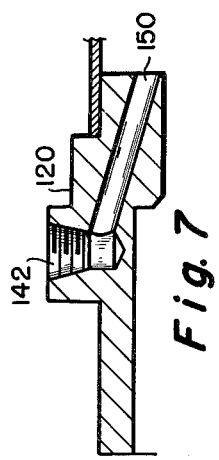
INVENTORS.
Thomas A. Insolio
Peter J. Magrini, Sr.
Reno Carini
Zayman C. Clements
BY Webb, Mackey & Burden
THEIR ATTORNEYS Jan. 30, 1962 T. A. INSOLIO ETAL 3,018,587
GLASS CUTTER TROLLEY UNIT
Filed May 31, 1957 4 Sheets-Sheet 3

INVENTORS.
Thomas A. Insolio
Peter J. Magrini, Sr.
Reno Carini
Zayman C. Clements
BY
THEIR ATTORNEYS Jan. 30, 1962 T. A. INSOLIO ETAL 3,018,587
GLASS CUTTER TROLLEY UNIT
Filed May 31, 1957 4 Sheets-Sheet 4

INVENTORS.
Thomas A. Insolio
Peter J. Magrini, Sr.
Reno Carini
Zayman C. Clements
BY Webb, Mackey & Burden
THEIR ATTORNEYS 3,018,587
Patented Jan. 30, 1962

3,018,587
GLASS CUTTER TROLLEY UNIT
Thomas A. Insolio, Jeannette, Pa., and Peter J. Magrini, Sr., Reno Carini, and Zayman C. Clements, Okmulgee, Okla., assignors to American Window Glass Company, Pittsburgh, Pa., a corporation of Pennsylvania
Filed May 31, 1957, Ser. No. 662,656
14 Claims. (Cl. 49—48)

The present application relates to a glass cutter trolley unit, particularly a self-propelled unit for use in automatic glass cut-off machines.

The invention according to this application is primarily adapted for glass cut-off machines of the type generally as shown in Klages U.S. Patent 2,650,430. It is particularly suited to the automatic operation contemplated in such machines, involving a two-stroke cycle for the cutter so as to move it through a full cutting stroke constituting half a cycle and retracting the cutter in a return stroke to complete that cycle and prepare for the next. Briefly, glass cutting machines of this general type include a cage adapted for vertical movement alongside a rising sheet of glass, a cutter trolley on that cage which moves transversely across the glass sheet, and a glass measuring stop carried by the cage which contacts the advancing edge of the sheet. The cage is raised by chains connected to it and passing over sprockets on a cage lift shaft located adjacent the top of the machine. That cage lift shaft is driven from a set of conveyor rolls which move the glass sheet upwardly. In use, the cage which carries the transversely movable cutter moves at the same speed as the rising glass sheet to eliminate relative shift of the cutter lengthwise on the glass in order that an accurate cut can be made exactly at right angles to the direction of movement of the sheet. Particular difficulties are encountered in this specific task of holding the cutter relatively immovable to the moving sheet in the lengthwise respect, but freely movable crosswise thereof. Deflection of the track on which the cutter moves can cause variations in the score line which it strikes and also a warped glass sheet being scored can cause these same variations. In addition, in the direction normal to the plane of the sheet, the cutter sometimes tends to bounce and skip leaving holidays and a general waviness in the cut for this reason and others.

The present invention eliminates or materially reduces the foregoing difficulties by providing for application of cutter pressure in two stages so as to take up all slack and then begin the cut thereby to avoid wheel bounce; by providing a deep section modulus to the cutter track which eliminates deflection thereof and also takes out the reaction of torsional forces caused by the cutting pressure on the glass; and also by providing a double acting cutter cylinder which is instantaneously responsive in its action and which produces the described two-stage application of cutting pressure.

As above indicated, this invention primarily is suited to the automatic operation of the Klages type glass cutting machines. The cutter structure is uniquely self-sufficient, however, complete with captive propulsion motor and cutter cylinder thereon provided and, therefore, it has broad application and, if desired, is readily applicable for instance, to horizontal cutting and glass scoring apparatus.

In the accompanying drawings which illustrate a preferred embodiment of the invention:

Figure 2:
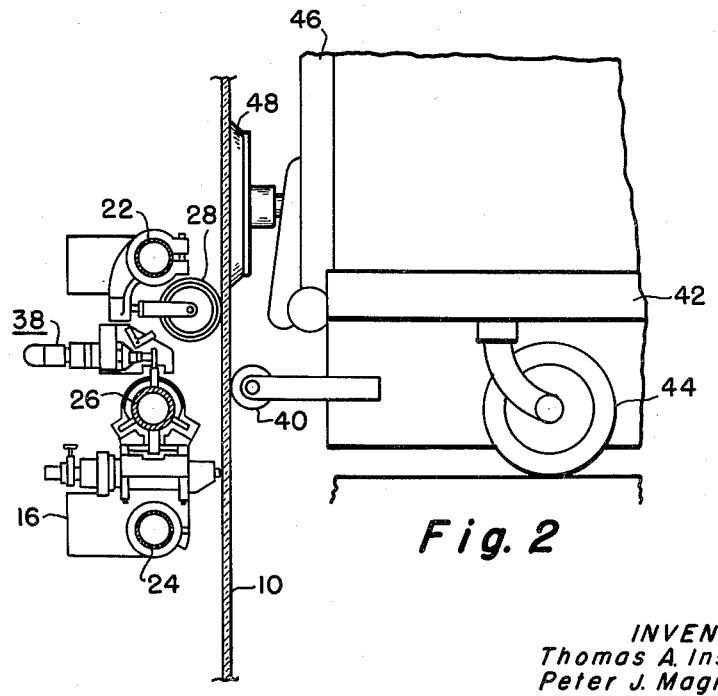
FIGURE 2 is a side elevation thereof.
Figure 3:
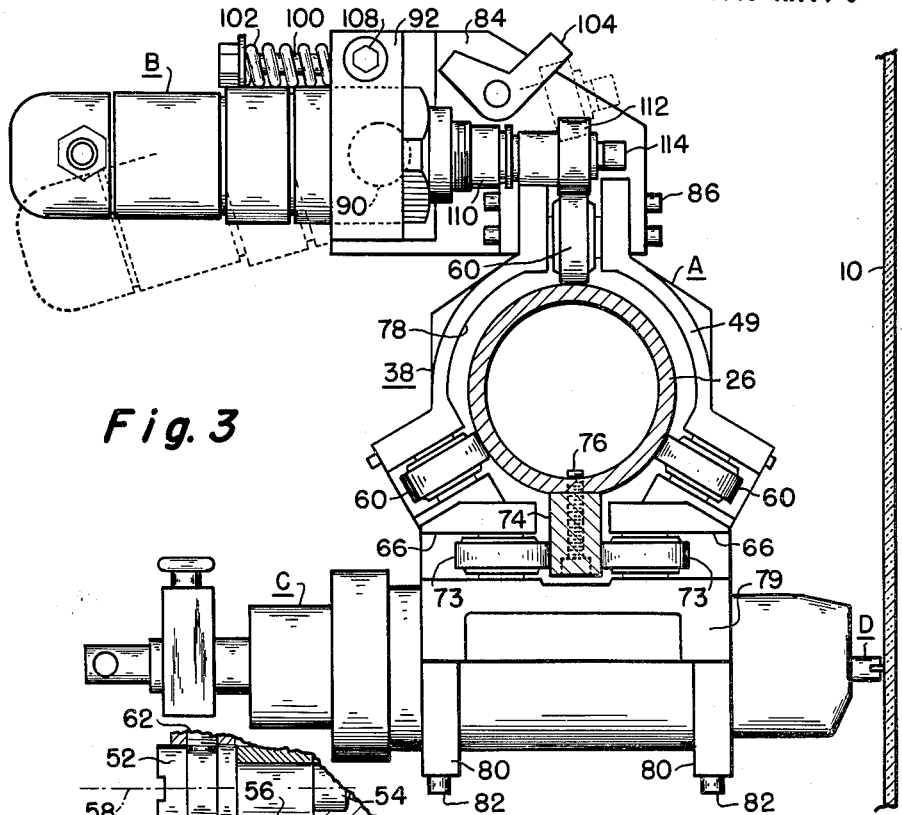
Figure 4:
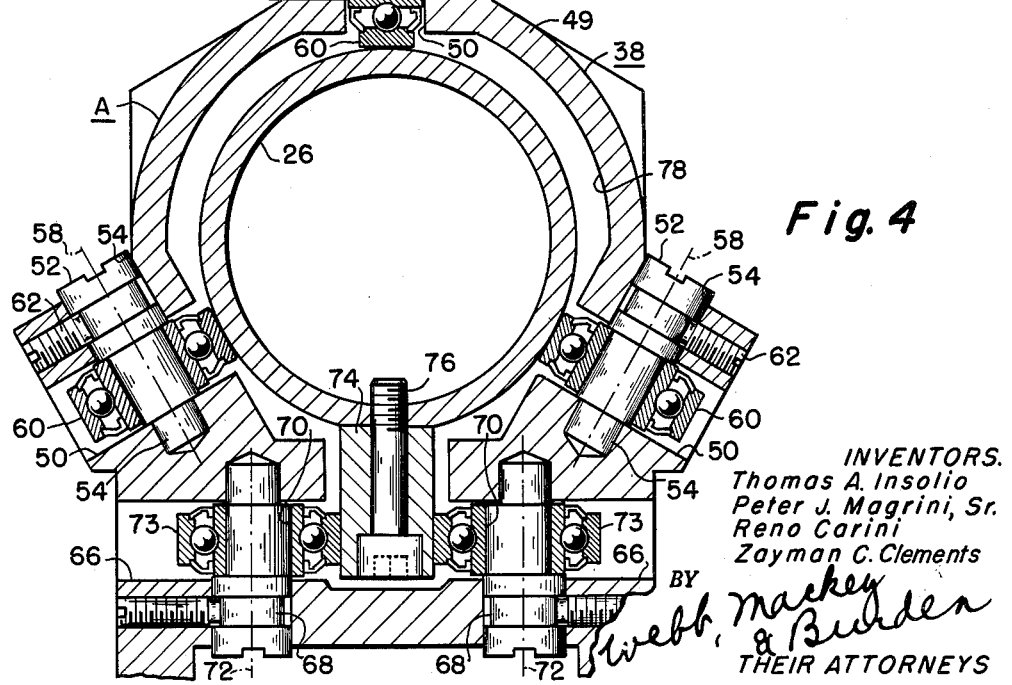
Figure 9:
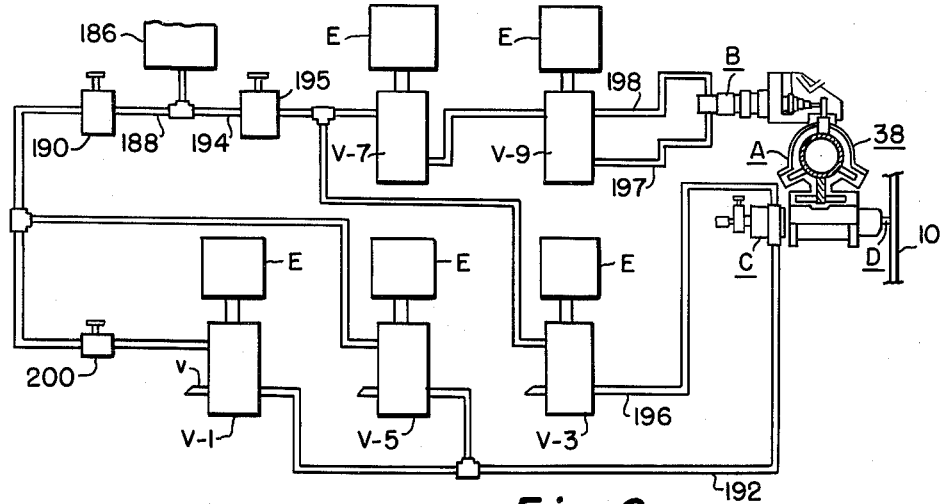
Figure 10:
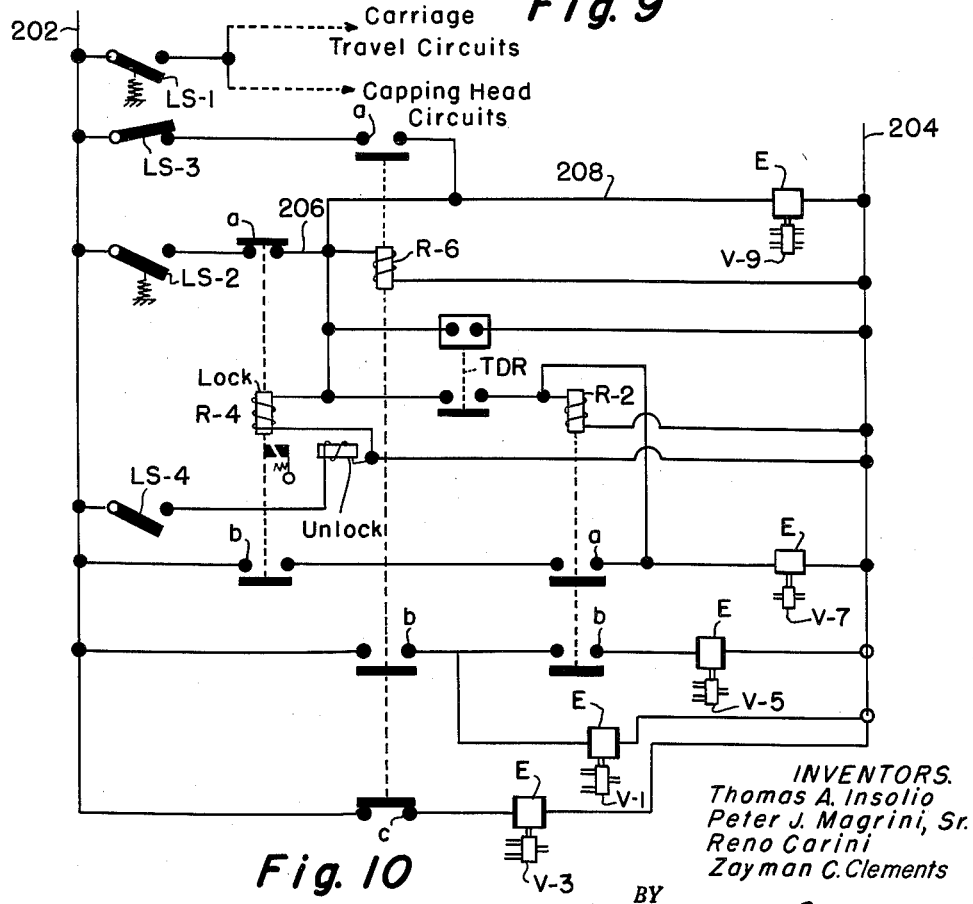

FIGURE 3 corresponds to FIGURE 2, but showing only the cutter component thereof to enlarged scale in side elevation;

FIGURE 4 is a further enlarged view of the trolley portion of FIGURE 3, likewise in side elevation, but with certain parts broken away for clarity;

FIGURES 5 and 6 are top plan and longitudinal elevational views of another portion of FIGURE 3 to enlarged scale;

FIGURE 7 is a fragmentary view corresponding to FIGURE 6, but in another plane;

FIGURE 8 is an enlarged sectional view in top plan of a portion of FIGURE 5;

FIGURE 9 is a schematic showing of the pneumatic system for the machine, and;

FIGURE 10 is a schematic diagram showing the electrical wiring system.

Figure 1:
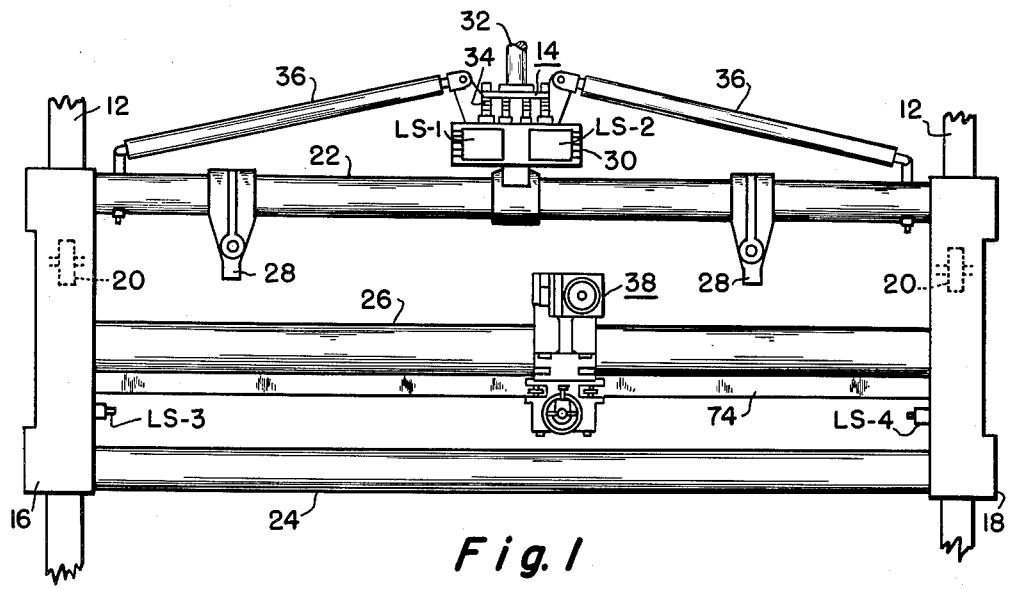
FIGURE 1 is a front elevation of a glass cutting machine embodying the present improvement.

In FIGURES 1 and 2 of the drawings, a glass sheet 10 is moved upwardly in a vertical direction by means of the conveying rolls of Fourcault apparatus, not shown, and after being delivered thereby, the parent sheet of glass is adapted to be subdivided by being cut or scored transversely of its direction of movement. For this purpose a glass cutting machine is provided having a parallel pair of upright side rails 12 to which there is mounted a cage 14. The cage includes two end brackets 16 and 18 having one or more rollers 20 which roll in slots formed in the side rails 12. The cage 14 further includes a horizontally extending pair of upper and lower tubular members 22, 24 which are connected at their opposite ends to the brackets 16, 18. A horizontally extending monorail 26 intermediate the upper and lower tubular members is similarly connected at each end to the bracket 16 or 18 at that end. The upper one of the tubular members 22 carries a pair of glass engaging rollers 28 at points spaced from its opposite ends and at the midportion it supports a measuring head 30 which carries a vertically extending measuring tube 32 through a lost motion connection 34. A pair of oppositely directed tie rods 36 steadies the measuring head 30 to form a trusswork therefor in cooperation with the upper tubular member 22. The measuring tube 32 carries a glass measuring stop, not shown, after the general manner of the machine in the noted Klages Patent 2,650,430 so as to operate the lost motion connection 34 and actuate two limit switches including a limit switch LS-1 and LS-2 mounted to the measuring head 30. The limit switches LS-1 and LS-2 are adjusted to close and activate a cutting cycle toward the last part of the stroke of the measuring tube 32 upwardly, the tube 32 holding the switches closed for the better part of the entire cycle and then opening the switches LS-1 and LS-2 preparatory to starting the next cycle. A cutter trolley 38 is mounted to shift as a unit on the track defined by the monorail 26 which has, associated with its opposite ends, a pair of limit switches LS-3 and LS-4 which are mounted to the respective end brackets 16, 18 in the path of movement of the trolley 38.

In a manner hereinafter more fully described, the cutter trolley 38 executes a two-stroke cycle traveling from the limit switch LS-4 to the limit switch LS-3 and back, so as to score the rising parent glass sheet 10 and provide a break line. The scored line thereafter transfers upwardly with the moving sheet to a point opposite a break-off roller 40 carried by a glass break-off machine 42 of the type generally as shown in copending application, Serial No. 518,731, filed June 29, 1955 in the name of Thomas A. Insolio, one of the coinventors hereof. The break-off machine 42 is more completely described in that application, but in general it is portably mounted on a set of caster wheels 44 and carries a swingable frame 46 supporting a set of gripper cups 48. Under vacuum action these gripper cups grip the sheet of glass to bend it clockwise as viewed in FIGURE 2 about the break-off roller 40 so as to snap the glass along a clean parting line delineated by the score of the cutter carried by the carriage 38.

In FIGURES 3 and 4 the cutter trolley unit 38 essentially includes a wheeled trolley A, a double acting pneumatic propulsion motor B mounted thereto at the top and a double acting pneumatic cutting cylinder C and a wheel post assembly D which are mounted to the lower portion of the trolley for movement therewith along the monorail 26, the latter being primarily tubular or circular in cross section (may have other section). More specifically, the wheeled trolley A has a frame 49 formed from a one-piece casting which is provided with a set of three radial wheel slots 50 at each end, each slot being spaced at 120° from the others in the set so as to provide an uppermost slot and two intermediate slots 50. Each slot 50 has a wheel axle 52 crosswise thereof and provided with portions 54 which are concentric with one another and also the upper axle has one portion 56 which is eccentric relative to the axle axis 58. Each axle carries a ball bearing roller 60 engageable with the circular surface of the monorail 26 and these axles are each securely locked by means of a bind screw 62. Release of the bind screw 62 holding the upper axle 52 enables it to be rotated with the eccentric portion 56 thereof shifting the roller 60 so as to tighten it solidly in engagement with the monorail 26 thereby rendering all rollers snug and the carriage frame 49 concentric to the monorail.

The trolley frame 49 has another set of two wheel-slots 66 at each end and each provided with an axle 68 having concentric and eccentric portions 70 relative to the axis 72 thereof. The eccentric portions 70 of each axle carry ball bearing rollers 73 on adjustable axes in positive engagement with a radially depending rail extension 74 on the lower side of the monorail 26. This extension rail 74 is bolted at 76 at suitable spaced points to the monorail so as to reinforce it longitudinally and also to eliminate the torsional forces of reaction of the trolley A on that rail.

The trolley frame 49 will be noted to have an internal opening 78 which receives the monorail 26 and surrounds the same when the trolley and monorail are assembled together initially. Thereafter the upper roller axle 52 at one end is rotated about its longitudinal axis 58 so as to swing the eccentric portion 56 and tighten the roller 60 snugly into engagement with the circular portion of the rail 26. Thereafter the set of two axles 68 at that end is adjusted so that their individual eccentric portions 70 clamp the rollers 73 firmly against the rail extension 74 at opposite sides and in a manner to hold the trolley frame 49 fixed in the vertical plane of the extension 74 so as to be exactly erect in addition to being concentric to the monorail 26. The same adjustment is made on the rollers at the opposite end of the trolley frame 49 in the other set of three slots 50 and in the companion set of two slots 66. The adjustment of the rollers 60 in their sets of three slots at the opposite ends of the frame 49 insure that the frame is exactly concentric to the longitudinal axis of the monorail 26 so as to establish an accurately held longitudinal cutter path. The adjustment of the other rollers 73 insures an exactly maintained horizontal cutting plane for the wheel post assembly D.

The lower portion of the trolley frame 49 has a pair of spaced flange brackets 79 to which a pair of clamping saddles 80 is secured by means of a set of suitable bolts 82. This pair of clamping saddles 80 clamps the double acting pneumatic cutting cylinder C to the frame 49 and when this frame 49 is exactly vertical, the cylinder C is exactly horizontal and normal to the surface of the glass 10. It is essential that this normalcy be maintained for accurate cutting of the glass.

In FIGURE 3, the trolley frame 49 carries a transverse vertical plate 84 fixed by bolts 86 to its upper portion. A pair of trunnions 90 rigid with a motor mounting bracket 92 is journaled in trunnion bearings in the plate 84 to pivot the propulsion motor B into and out of running position. A bolt 100 carried by the plate 84 has a helical return spring surrounding it so as to seat firmly at one end on the head of the bolt 100 and thrust at the opposite end on a lever (not shown) carried by the bracket 92. The return spring thus constantly urges the motor mounting bracket 92 into the solid line position of FIGURE 3. Whereas a retracting latch 104 pivoted to the fixed plate 84 is operated by hand to engage the bracket 92 in a manner to rotate it counterclockwise into the dotted line position of FIGURE 3. The bracket 92 is provided with a split yoke formation and a clamping bolt 108 therein to clamp the midportion of the motor B securely within the motor mounting bracket 92.

A reversible 4-vane air motor has been found very satisfactory in operation as the propulsion motor B, and includes a protruding rotor shaft 110 carrying a fiber friction wheel 112 at the outer end which is secured thereto by means of a retainer bolt 114. Under bias of the return spring 102, the friction wheel 112 rests lightly on one upper roller 60 in the trolley frame and this backed-up relationship provides a slip clutch connection under proper traction whereby rotation of the motor shaft 110 turns the roller 60 and drives the trolley unit 38 along the monorail 26.

In FIGURES 5–7, the double acting pneumatic cutter cylinder C is shown in assembled relation with the wheel post assembly D which it carries. The cutter cylinder C has a closure means or head 120 screw-connected thereto at the outer end relative to the glass 10 and further has an inner closure means or head 122 which is also solidly screw-connected thereto. A hollow centered slidable piston 124 disposed between these closure heads divides the space therebetween into a pair of working chambers 126 and 128. At its opposite sides the piston 124 carries a pair of respective hollow inner and outer piston rod portions 130 and 132, the inner one of which carries a cutter guard 134 pressed thereon. The piston rod portions 130 and 132 extend through suitable bearings 136 in the respective end closure head to which they are sealed by means of a set of leather seals 138. The outer closure head 120 has a pair of laterally staggered air ports 140 and 142 which are internally threaded to receive air hose fittings. The port 140 is suitably connected through an internal passage 144 in the outer closure head 120 to the hollow interior of a fixed tube element 146 which is anchored in the closure head by having one end press fitted into a socket therein. The opposite end of the element 146 passes through a concentric guide opening 148 formed in the piston 124 eccentrically to its hollow center so as to prevent the piston from rotating about its axis. The hollow interior of the element 146 carries compressed air to and vented air from the working chamber 128 so as to apply the necessary pressure force differential at that side of the piston.

The other air port 142 communicates through an internal passage 150 in the outer closure head 120 so as to connect with the working chamber 126 and pressurize and vent that side of the piston 124 to move it. The hollow centered piston 124 and the piston rod portions 130 and 132 carry a longitudinal insert in their interior consisting of a cutting tool holder 152 which at one end is recessed with a socket 154 to carry the wheel post assembly D at a point within the guard 134 and accessible to the glass sheet 10. At the opposite end the holder 152 carries a cross pin 156 for use in manually withdrawing it through the piston rod portions 130, 132. A latching plate 158 fast to the outer end of the outer rod portion 132 slidably supports a spring pressed plunger 160 which sockets itself in a transverse bore 162 in the holder 152. A pull knob 164 is used to withdraw the plunger to permit the holder 152 to be withdrawn from its internal position and exposed outside the piston rod portions 130, 132 for substitution of a cutter.

In FIGURE 8, the wheel post assembly D socketed in the cutting tool holder 152 includes a cutting tool sleeve 166 in which a wheel post 168 is swiveled by means of spaced circular rows of ball bearing elements 170. The wheel post 168 has a reduced and threaded end portion 172 onto which a retaining nut is started at 174a and threaded into a solid line position shown at 174 in FIGURE 8 so as to tighten the bearing elements 170 in their respective rows. Adjacent the reduced end portion 172 and at a point between the bearings 170, the wheel post 168 has a flat portion 176, engaged by a pin stop 178 which is press fitted in an opening through the side of the sleeve 166. The stop 178 engages the flat portion 176 in a preselected manner to limit the caster or swiveling action of the wheel post 168 to 5° angularity on either side of the neutral longitudinal plane thereof which is horizontally disposed. The wheel post 168 has an enlarged slightly offset portion at the outer end to firmly hold a sheet metal clip insert 180 having spaced slots formed therein to receive and lock therein the opposite ends of an axle 182 for a cutter wheel 184. Owing to the limited caster movement in the swivel connection afforded by the wheel post 168, the cutter wheel axle 182 is, therefore, limited to a minor angle of swivel movement in vertical planes in its operation toward and upon the glass 10. Therefore, there is little caster effect to be overcome on initial contact with the glass inasmuch as the wheel 184 is substantially in a horizontal plane at all times. This relationship is maintained through the inflexible connection of the tube element 146 and guide opening 148 and the very limited amount of movement in the connection between the stop 178 and the flat portion 176 on the wheel post 168.

In FIGURE 9, a compressed air source 186 constituting a compressor or a storage tank is shown pneumatically connected to the propulsion and cutter devices B, C on the cutter trolley 38 so as to pressurize the double acting power units thereon. The compressed air source 186 has an outlet which is split into a first branch 188 and thence connected through an air pressure regulator 190 to a pair of solenoid valves V1 and V5. Each solenoid valve V1 and V5 includes an electromagnetic coil E and they are connected in parallel wtih one another so as to feed a common flexible hose 192 which is connected to one or the other of the air ports 140, 142 (not shown) on the cutter cylinder C. A second branch 194 connects the source of compressed air 186 through an air pressure regulator 195 to a pair of solenoid valves V3 and V7, each having an electromagnetic coil E to control the same.

The solenoid valve V3 is a retracting valve connected through a flexible hose 196 to another one of the air ports 140, 142 (not shown) on the cutter cylinder C. A reversing solenoid valve V9 is included in series with the valve V7 and supplies a pair of flexible air hoses 197, 198 which are selectively pressurized and vented or vice versa with compressed air to control the opposite sides of the propulsion motor B so as to drive the cutter trolley 38 in one direction or the opposite direction.

More specifically, the regulator 190 is set to deliver cutting air under pressure of approximately 4 p.s.i. to the solenoid valves V1 and V5, the valve V1 normally venting the hose 192 to atmosphere through a vent v and the valve V5 being normally closed. A restriction is interposed in the connection between the split first branch 188 and the valve V1 and as illustrated, this restriction consists of a needle valve 200 which is adjusted for delivering air in limited quantities to the valve V1 to delay build-up of cutting pressure to at least approximately two seconds before it reaches the full 4 p.s.i. cutting pressure. The regulator 195 is set to deliver pressure at approximately 70 p.s.i. to the valve V7 which pressurizes the propulsion motor B and to the retracting valve V3 which applies retracting air to the cutting cylinder C.

In use, on the assumption that the cutter trolley 38 occupies its initial starting position, the coil E of the solenoid valve V1 is energized so as to introduce air into the flexible hose 192 in limited quantities as it restrictively passes through the needle valve 200. The double acting cutter cylinder C immediately begins to advance the wheel post D into gentle engagement with the glass 10. After approximately a 2-second time delay measured from energization of the solenoid valve V1, the coil E on the solenoid valve V5 is energized to open the flexible hose 192 unrestrictedly to full cutting air pressure whereupon to insure that the wheel post D is placed under the desired 10 pounds total thrust (4 p.s.i.) against the glass 10 for a cutting stroke. Simultaneously, the coil E controlling the solenoid valve V7 is energized and the already energized valve V9 cooperates therewith to deliver a full 70 pounds per square inch propulsion air pressure to the propulsion motor B on the appropriate side thereof producing forward motion. The trolley 38 completes the cutting stroke half of its cycle whereupon the respective valves V1, V5, and reversing valve V9 are simultaneously deenergized and concurrently the retracting valve V3 is energized. The retracting valve V3 cooperates with the valves V1 and V5 in respectively applying pressure to the opposite working chamber in the cutter cylinder C and depressurizing and venting the initially pressurized side so as to retract the wheel post assembly D from the glass 10. Reversal of the direction of the stream of air in the flexible hoses 197 and 198 due to deenergization of the reversing valve V9 causes reverse rotation of the propulsion motor B of the trolley 38 to complete the non-cutting stroke so as to finish the last half cycle of the operation. The cycle is then repeated.

It will be noted that air is applied to the cutter cylinder C in three stages of operation, no one of which affords the same pressure. That is to say, initial low pressure is restrictively applied to one side of the piston, first by the valve V1, then unrestricted pressure of the same generally low value is applied secondarily to that same side by the valve V5 at the same time at which the valve V7 is thirdly applying propulsion air pressure to the motor B to propel the trolley 38, and finally that same 70 p.s.i. propulsion air pressure is applied at the proper time in a reverse direction by the valve V9 to the propulsion motor B and by the retracting valve V3 to the opposite side of the piston substantially at or before that time to cause it to retract the wheel post assembly D to non-cutting position. The two-second delay on admitting propulsion air pressure to the propulsion motor B allows the cutter cylinder C to establish full stabilized contact between the wheel post assembly D and the glass 10 prior to rotation of the motor B starting the trolley in motion.

FIGURE 10 diagrammatically shows an electrical wiring system controlled by the limit switches LS–1, LS–2, LS–3, and LS–4 in conjunction with the respective coils E of the valves V1, V3, V5, V7, and V9 for automatically controlling the cutter trolley E cutting cylinder. More specifically, the normally closed limit switches LS–1 and LS–2 are arranged to activate a cutting cycle for which electric current is supplied through a pair of spaced conductors 202, 204. LS–1 and LS–2 are held open by the measuring post and closure of the limit switch LS–2 by the raising of the measuring tube 32 as described in connection with FIGURE 1, thus energizes a relay network 205 to actuate a relay R6 into its displaced position and to energize a time delay relay TDR so as to initiate the time delay period, for instance, the above indicated two seconds in one physically constructed embodiment of the invention. Immediately the reversing relay R6 closes an upper set of holding contacts a which are located in a holding circuit controlled by the limit switch LS–3 forming a reversing switch for the reversing relay R6. The relay R6 further includes lower sets of contacts b and c. On the expiration of the two-second time lag, the time delay relay TDR closes its contacts to energize a relay R2 which closes a set of intermediate holding contacts a thereon and simultaneously closes its lower set of contacts b. Accordingly, the reversing solenoid valve V9 remains energized in its forward position through a branch conductor 208 leading from the relay network 206 and as it assumes this forward position the relay contacts R6b close to energize the solenoid valve V1 and thereby apply the first stage of pressure to the cutter cylinder C, not shown. Relay contacts R6c simultaneously open to deenergize V3 to vent the retraction air pressure.

After this two-second delay period, the relay R2 also closes its lower sets of contacts a and b so as to apply air pressure to the propulsion motor through the valve V7 and also apply full cutting pressure unrestrictedly to the cutter cylinder C through the valve V5. Accordingly, the cutter carriage operates through the cutting stroke half of its cycle and in getting under way it releases the limit switch LS-4 so as to deenergize the unlocking coil of relay R4. The locking coil of R4 was energized through 206 to open contacts R4a and isolate LS-2 from 206. At the end of the cutting stroke the cutter carriage trips the reversing limit switch LS-3 open to release the holding circuit for the reversing relay R6 which leads through the contacts R6a. This action releases the relay R6 which through the contacts R6b deenergizes the cutter cylinder valves V1, V5 and which through the contacts c energizes the retracting solenoid valve V3 so as to retract the cutter. Simultaneously, the contacts R6a deenergize the reversing solenoid valve V9 which therefore assumes its reverse drive position to cause the air motor B to reversibly rotate to drive the cutter trolley 38 through the return stroke half of the cycle. When the cutter trolley 38 reaches the end of its return stroke it trips the switch LS-2 to open circuit the forward relay R2 by energizing the unlocking coil of R4 so as to open the holding circuit which contains the relay contacts R2b. The operation is then repeated.

In summary, the relay R6 becomes immediately energized at the outset of each cycle and remains so for the cutting stroke part of that cycle and then is dropped out of circuit. The time delay relay TDR has the same operation to accomplish its time leg purposes. The forward relay R2 remains energized for all but the first two seconds of the cutting stroke cycle and for the complete return stroke of the cutter trolley so as to be dropped out of the circuit only upon completion of the return stroke. The contacts of relay R4 are latched in their displaced position at the start of the cycle and provide a means for isolating LS-2 during the cycle, thus permitting LS-3 to control the end-of-cut operations. Contacts R4b form part of the R2 holding circuit which is opened at the end of the cycle when LS-4 is tripped. Relay R4 continues operation independently of the time delay relay TDR which actuated it originally. When the forward relay R4 is deenergized so as to cease operation, it thereby recloses the relay network 206 to prepare the relays R6 and TDR for another cycle which is initiated by the limit switch LS-2. The cycle repeats each time the switch LS-2 is operated by the measuring tube 32.

It is apparent that the components of the cutter trolley unit described in the foregoing FIGURES 1–10, establish cooperation with one another to very evident advantage. That is to say, the air motor B pivots the friction wheel 112 into propelling position and delivers rotary driving power thereto whereas the cutter cylinder C slides the cutter wheel 184 under power into cutting position so as to provide for self-sustaining power operation both ways with double action each way on the work-performing wheel element thereof. The rail extension 74 on the monorail 26 not only reinforces that rail against sag and lengthwise deflection, but also eliminates torsional forces thereon and solidly takes the reaction of the cutter cylinder C to maintain it always horizontal. The time delay coaction function which the relay TDR performs in enabling the relay R6 to assume its displaced position two seconds prior to operation of the forward relay R2, makes it possible for the cutter wheel 184 to come into gradually applied contact with the glass under full cutting load before the air motor B starts the wheeled trolley A in its reciprocatory movement. The prior application of this full cutting pressure obviates cutting contact made with a running start after the trolley is in motion and eliminates the tendency for the cutting wheel to bounce and skip as its starts rolling. If desired, an ordinary pressure switch sensitive to pressure in the cutting air pressure line 192 can be substituted for the time delay relay TDR and given the function of the latter in the second split branch 194 (FIGURE 9) so as to start forward movement of the cutter trolley 38 only after it senses sufficient pressure build-up of the cutting air. However, the use of the illustrated time delay relay TDR has been found to be very satisfactory and is preferable for that reason.

Variations within the spirit and scope of the invention described are equally comprehended by the foregoing description.

We claim:

1. In apparatus for cutting a sheet of glass or the like, a cutting tool, a double-acting cylinder operatively mounting a shiftable member for supporting said cutting tool, means having a control element for controlling the same to apply an initial shifting force to said cylinder-shiftable member sufficient to shift the cutting tool into light initial contact with the sheet, and regulated pressure means including a control element effective to apply an ultimate force to said member superimposing full cutting pressure on the cutting tool.

2. In apparatus for cutting a sheet of glass, a cutting tool for scoring the sheet in plane across its width, a double-acting cylinder presenting a pressure movable member for supporting said cutting tool for shifting movement, cylinder control valves which when operated respectively introduce pressure fluid in limited and full streams of flow to the pressure movable member, and means to operate said valves at intervals in immediate succession to one another to shift the cutting tool into light engagement with the glass under gradually applied pressure and thereafter to expose it to the application of full pressure.

3. In apparatus for cutting a sheet of glass or the like, a tool having a cutter wheel, a double-acting cylinder containing therein a shiftable piston supporting said wheel, and means connected to said cylinder to operate the tool in two stages including compressed air valves connected to the piston and effective to apply positive air pressure thereto through a path of predetermined restriction for gently loading the cutter wheel against the glass and through a less restricted path to hold the cutter wheel under full working load on the glass after it contacts the same.

4. In apparatus for cutting a sheet of glass, a cutting tool, a double-acting cylinder containing a pressure movable slide member for supporting said cutting tool for sliding movement, solenoid valves which are connected to said cylinder to respectively apply pressure fluid in limited and full streams of flow to the pressure movable slide member, and electrical control circuit means to operate said solenoid valves according to a timed sequence in immediate succession to one another to slide the cutting tool into light engagement with the glass under gradually applied low pressure and then freely apply the low pressure after the initial time interval.

5. In apparatus for cutting sheet glass or the like, a self-propelled cutter trolley, power means thereon including a cutter cylinder and a riversibly rotatable air motor, slip drive traction means connected to said motor for effecting relatively gentle propulsion of said trolley thereby, a plurality of control elements for connecting said power means through different paths to a source of energy, and means for operating the power means in two stages having a first operative connection to one cutter control element to establish a restricted path to the cutter cylinder for gently loading the cutter in a gradual slack eliminating stage, and having a sequentially operative connection to a propulsion control element in a full loading path to the propulsion motor for starting the cutting stage of operation.

6. In apparatus for cutting traveling sheet glass or the like, a self-propelled cutter carriage, power units thereon including a cutter connected piston and a propulsion motor, a plurality of control valve elements for connecting said power units through different conduits to a source of compressed air, means for loading the cutter connected piston in two stages having a first operative connection to one cutter control element to establish a restricted air path through one conduit to the cutter cylinder for lightly loading the cutter in a slack eliminating stage which is gradually applied, and having a sequentially operative connection to another valve control element in an unrestricted conduit to the cutter cylinder for maintaining a fully loaded stage, and means timed to said sequentially operative connection and connected to a valve control element in another unrestricted conduit to the propulsion motor for starting the cutter trolley in self-propelled motion.

7. In apparatus for cutting traveling sheet glass or the like, a self-propelled cutter trolley, power means thereon including a cutter cylinder and a rotary propulsion motor, a source of regulated low air pressure, a source of regulated high air pressure, means forming a restricted air path between the low pressure source and said cutter cylinder including a conduit and a first valve for admitting low pressure air at a limited rate to the cutter cylinder to effect slack eliminating movement of the cutter, means forming an air path between the high pressure source and said propulsion motor including a conduit and a second valve to freely apply high pressure air to the rotary propulsion motor to start the carriage, and means connected to automatically operate said valves in sequence with the second valve delayed until after the first valve is operated so that cutter movement always precedes motor movement.

8. In apparatus for cutting traveling sheet glass or the like, a self-propelled cutter trolley, power means thereon including a cutter cylinder and a propulsion motor, a source of low air pressure, a source of high air pressure, means forming a restricted air path between the low pressure source and said cutter cylinder including a conduit and a first valve for admitting low pressure air at a limited rate to the cutter cylinder to effect slack eliminating movement of the cutter, means including a conduit and a second valve to freely apply low pressure air to the cutter cylinder, and means including a conduit and a third valve to apply high pressure air to the propulsion motor.

9. In apparatus for cutting traveling sheet glass or the like, comprising a self-propelled cutter trolley, and power means thereon including a cutter cylinder and a propulsion motor: a pneumatic operating and control system therefor including, in combination, a source of regulated air pressure, a second source of regulated air pressure, means forming a restricted air path leading from the first pressure source including a conduit and a first valve for admitting air at a limited rate therefrom to the cutter cylinder to effect slack eliminating movement of the cutter, means including a conduit and a second valve to freely apply air from the first pressure source to the cutter cylinder, means including a conduit and a third valve connected to the second source to apply air to the propulsion motor, and sequentially acting means for individually operating said first valve and for simultaneously operating said second and third valves thereafter.

10. In apparatus for cutting traveling sheet glass or the like, a self-propelled cutter trolley, captive power units thereon including a cutter cylinder and a propulsion motor, a source of low air pressure, a source of high air pressure, means forming a restricted air path between the low pressure source and said cutter cylinder including a conduit and a first valve for admitting low pressure air at a limited rate to the cutter cylinder to effect slack eliminating movement of the cutter, means including a conduit and a second valve to freely apply air from the low pressure source to the cutter cylinder, means including a conduit and a third valve to apply high pressure air to the propulsion motor, sequentially acting means for individually operating said first valve and for simultaneously operating said second and third valves thereafter, and means actuated at a subsequent time to apply high pressure air in a reverse direction to both units substantially simultaneously.

11. A trolley unit system adapted for making a traversal across the width of sheet glass to score same, comprising a wheeled trolley frame, captive power means thereon consisting of a double-acting cylinder and a reversibly rotatable air propulsion motor, slip drive traction means connected to said propulsion motor for effecting propulsion of said trolley unit thereby, a wheel post and cutter wheel assembly, said cylinder having a piston rod constituting the sole means of support of said wheel post and cutter wheel assembly, and movable therein from an idle position with respect to said glass sheet to a more forward position in the direction of establishing initial contact between cutter wheel and glass sheet, cutting air pressure applying means to deliver cutting air pressure in a forward direction to said double-acting cylinder in its initial forward position, propulsion air pressure applying means to deliver propulsion air pressure in a forward direction to said propulsion motor, and means to apply common pressure in the same reverse direction to both power means for their conjoint reversal.

12. In apparatus for cutting a traveling sheet of glass, a self-propelled cutter trolley with power means thereon including a propulsion motor and a double acting air cylinder carrying a cutter tool, a compressed air source, air line connection means including a restricted air path leading from said source for admitting cutting air and cutter tool retracting air to said cutter cylinder for moving said tool to and from its outset position, energy conducting line connection means for conducting energy to operate said propulsion motor and connected to a source of propulsion energy therefor, operable control solenoids, electrical means connected to automatically operate said control solenoids at different times, and means operated by said control solenoids and connected in each of said line connection means to activate same whereby said propulsion motor and the associated control solenoid operate with a delayed start with respect to the cutter cylinder so as to provide the latter with an outsetting interval which at least for its major portion elapses prior to outset of actual cutting.

13. In apparatus for cutting a traveling sheet of glass, a self-propelled cutter trolley with plural power means thereon, one coupled to a traction drive roller carried by said trolley for self-propelled rolling movement thereof in a straight line path, another of said power means comprising a double acting outsetting means carrying a cutter tool, energy conducting line connections for conducting energy to operate said drive roller power means and said cutter outsetting power means and connected to a source of energy therefor, operable control solenoids, electrical means connected to automatically operate said control solenoids at different times, and means operated by said control solenoids and connected in each of said line connections whereby said drive roller power means and the associated control solenoid operate with a delayed start with respect to the cutter outsetting power means so as to provide the latter with an outsetting interval which at least for its major portion elapses prior to the institution of said self-propelled movement.

14. In a glass cutter unit having supporting rail means provided therefor and operatively arranged therewith for movement imparting a running cut line to a substantially flat surface as it proceeds thereacross, a cutter trolley carrying rollers for rolling in a lengthwise direction along said rail means and carrying captive power means including an air cylinder and an air motor, said power means having their respective work performing elements independently connected to reciprocate a cutter into its cutting and inoperative positions relative to said trolley and to reciprocate the complete unit in the lengthwise direction aforesaid, energy conducting line means comprising flexible hoses forming separate connections between a common air source and each of said power means for reciprocating said glass cutting unit and for reciprocating said cutter relative thereto in the described manner, cyclically operating electrical means comprising switching elements operating in predetermined sequence with an intervening delay therebetween, and means operated by said switching elements and connected in said line means to control air passing through same whereby said air motor is relatively delayed in starting each unit reciprocating cycle thus enabling the air cylinder first to reciprocate the cutter on that glass cutting unit toward its cutting position solidly on the flat glass surface ready to start rolling.

References Cited in the file of this patent
UNITED STATES PATENTS

| | | |
|---|---|---|
| 415,750 | Vaile | Nov. 26, 1889 |
| 1,124,784 | Monro | Jan. 12, 1915 |
| 1,988,393 | Oakes | Jan. 15, 1935 |
| 2,324,149 | Gray | July 13, 1943 |
| 2,375,946 | Reichelt | May 15, 1945 |
| 2,556,757 | Guild | June 12, 1951 |
| 2,650,430 | Klages | Sept. 1, 1953 |
| 2,805,447 | Voges | Sept. 10, 1957 |

FOREIGN PATENTS

| | | |
|---|---|---|
| 690,262 | Great Britain | Apr. 15, 1953 |